(12) United States Patent
Giebel

(10) Patent No.: US 8,411,177 B2
(45) Date of Patent: Apr. 2, 2013

(54) METHOD AND APPARATUS FOR PROVIDING CURRENT PULSES TO ILLUMINATION SOURCE IN IMAGING SCANNER

(75) Inventor: James Giebel, Centerport, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 363 days.

(21) Appl. No.: 12/490,627

(22) Filed: Jun. 24, 2009

(65) Prior Publication Data

US 2010/0328506 A1 Dec. 30, 2010

(51) Int. Cl.
*H04N 5/335* (2006.01)
*G06K 7/10* (2006.01)

(52) U.S. Cl. .................... 348/294; 235/462.01
(58) Field of Classification Search ............ 348/223.1, 348/294; 235/262.15, 454, 462.01, 462.46
See application file for complete search history.

(56) References Cited

U.S. PATENT DOCUMENTS

| | | | |
|---|---|---|---|
| 5,782,354 A * | 7/1998 | Genix ........................... | 206/320 |
| 7,963,448 B2 * | 6/2011 | Testa ........................... | 235/472.01 |
| 2002/0008145 A1 * | 1/2002 | Walsh et al. .............. | 235/462.46 |
| 2003/0098352 A1 * | 5/2003 | Schnee et al. ............. | 235/472.01 |
| 2003/0234621 A1 | 12/2003 | Kriparos | |
| 2004/0170420 A1 * | 9/2004 | Fukui ........................... | 396/157 |
| 2008/0142600 A1 * | 6/2008 | Joseph et al. ............. | 235/462.42 |
| 2009/0127342 A1 | 5/2009 | Giebel et al. | |

FOREIGN PATENT DOCUMENTS

WO 2007000272 1/2007

OTHER PUBLICATIONS

International Search Report and Written Opinion dated Dec. 15, 2010 in related case PCT/US2010/039398.
CAP-XX Ltd., Jun. 2006, "Using Supercapacitors to Solve LED Flash Power Issues for High Resolution Camera Phones" included in list of presentations and White Papers on the Internet.
International Preliminary Report on Patentability and Written Opinion for counterpart International Application No. PCT/US2010/039398 mailed on Jan. 12, 2012.
"Using Supercapacitors to Solve LED Flash Power Issues for High Resolution Camera Phones," Jun. 2006, XP002607749, 3 pages.

* cited by examiner

*Primary Examiner* — Trung Diep
(74) *Attorney, Agent, or Firm* — Nong-Qiang Fan

(57) ABSTRACT

A method and apparatus for providing current pulses to the illumination source in an imaging scanner. The method includes: (1) sensing a current supplied from a current port to obtain a current-monitoring signal; (2) controlling a charge current provided to a storage capacitor based on the current-monitoring signal; (3) measuring a parameter related to a voltage across the storage capacitor; and (4) generating a driving current for the illumination source by the illumination driver circuit, if the parameter is above a predetermined threshold value, to provide a driving current for a illumination source in an imaging scanner.

15 Claims, 3 Drawing Sheets

METHOD AND APPARATUS FOR PROVIDING CURRENT PULSES TO ILLUMINATION SOURCE IN IMAGING SCANNER

FIELD OF THE DISCLOSURE

The present disclosure relates generally to an imaging scanner.

BACKGROUND

Various electro-optical systems have been developed for reading optical indicia, such as bar codes. A bar code is a coded pattern of graphical indicia comprised of a series of bars and spaces of varying widths, the bars and spaces having differing light reflecting characteristics. Some of the more popular bar code symbologies include: Uniform Product Code (UPC), typically used in retail stores sales; Code 39, primarily used in inventory tracking; and Postnet, which is used for encoding zip codes for U.S. mail. Systems that read and decode bar codes employing charged coupled device (CCD) or complementary metal oxide semiconductor (CMOS) based imaging systems are typically referred to hereinafter as imaging systems, imaging-based bar code readers, or imaging scanners.

Imaging systems electro-optically transform the graphic indicia into electrical signals, which are decoded into alpha-numerical characters that are intended to be descriptive of the article or some characteristic thereof. The characters are then typically represented in digital form and utilized as an input to a data processing system for various end-user applications such as point-of-sale processing, inventory control and the like.

Imaging systems that include CCD, CMOS, or other imaging configurations comprise a plurality of photosensitive elements (photosensors) or pixels typically aligned in an array pattern that could include a number of arrays. The imaging-based bar code reader systems employ light emitting diodes (LEDs) or other light sources for illuminating a target object, e.g., a target bar code. Light reflected from the target bar code is focused through a lens of the imaging system onto the pixel array. As a result, the focusing lens generates an image from its field of view (FOV) that is projected onto the pixel array. Periodically, the pixels of the array are sequentially read out creating an analog signal representative of a captured image frame. The analog signal is amplified by a gain factor, by for example, an operational amplifier. The amplified analog signal is digitized by an analog-to-digital converter. Decoding circuitry of the imaging system processes the digitized signals representative of the captured image frame and attempts to decode the imaged bar code.

As mentioned above, imaging scanners typically employ an illumination system to flood a target object with illumination from a light source. Light from the light source is reflected from the target object. The reflected light is then focused through a lens of the imaging system onto the pixel array, the target object being within a field of view of the lens. It is not uncommon for a single imaging scanner to employ as an illumination source multiple LEDs or cluster of LEDs for producing illumination that is reflected from the target object. Each of the LEDs may need to be driven somewhat simultaneously with a current pulse in order to provide the illumination for the imaging scanner. In some embodiments, each LED may even be overdriven with a current pulse which has a peak current that is significantly higher than its rated DC operating current. When large number of LEDs are used, the total peak current required to drive all of the LEDs somewhat simultaneously with a current pulse may exceed the maximum current that can be supplied by a power source.

Accordingly, there is a need for a method and apparatus for providing current pulses to the light source in an imaging scanner in a manner that the current supplied by the power source can be used more effectively.

SUMMARY

In one aspect, the invention is directed to an imager for imaging target objects. The imager includes an illumination source for providing illumination directed toward a target object, and photosensitive elements located within the imager for capturing an image from the target object while the imager is activated during an exposure period. The imager also includes a current sensing circuit, an illumination driver circuit, a storage capacitor, and a charger circuit. The current sensing circuit is operative to provide a current-monitoring signal related to a current supplied from a current port. The illumination driver circuit is operative to provide a driving current for the illumination source. The storage capacitor is operative to supply a current to the illumination driver circuit. The charger circuit is operative to provide to the storage capacitor a charge current that depends upon the current-monitoring signal provided by the current sensing circuit.

In one aspect, the invention is directed to a method. The method includes: (1) sensing a current supplied from a current port to obtain a current-monitoring signal; (2) controlling a charge current provided to a storage capacitor based on the current-monitoring signal; (3) measuring a parameter related to a voltage across the storage capacitor; and (4) generating a driving current for the illumination source by the illumination driver circuit, if the parameter is above a predetermined threshold value, to provide a driving current for a illumination source in an imaging scanner. The illumination driver circuit is operatively coupled to the storage capacitor to receive a current from the storage capacitor.

Implementations of the invention can include one or more of the following advantages. In cases where other system components in an imaging scanner are using less power, more power can be send to the illumination system to recharge the flash system more quickly or to drive the illumination source harder in torch mode. These and other advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
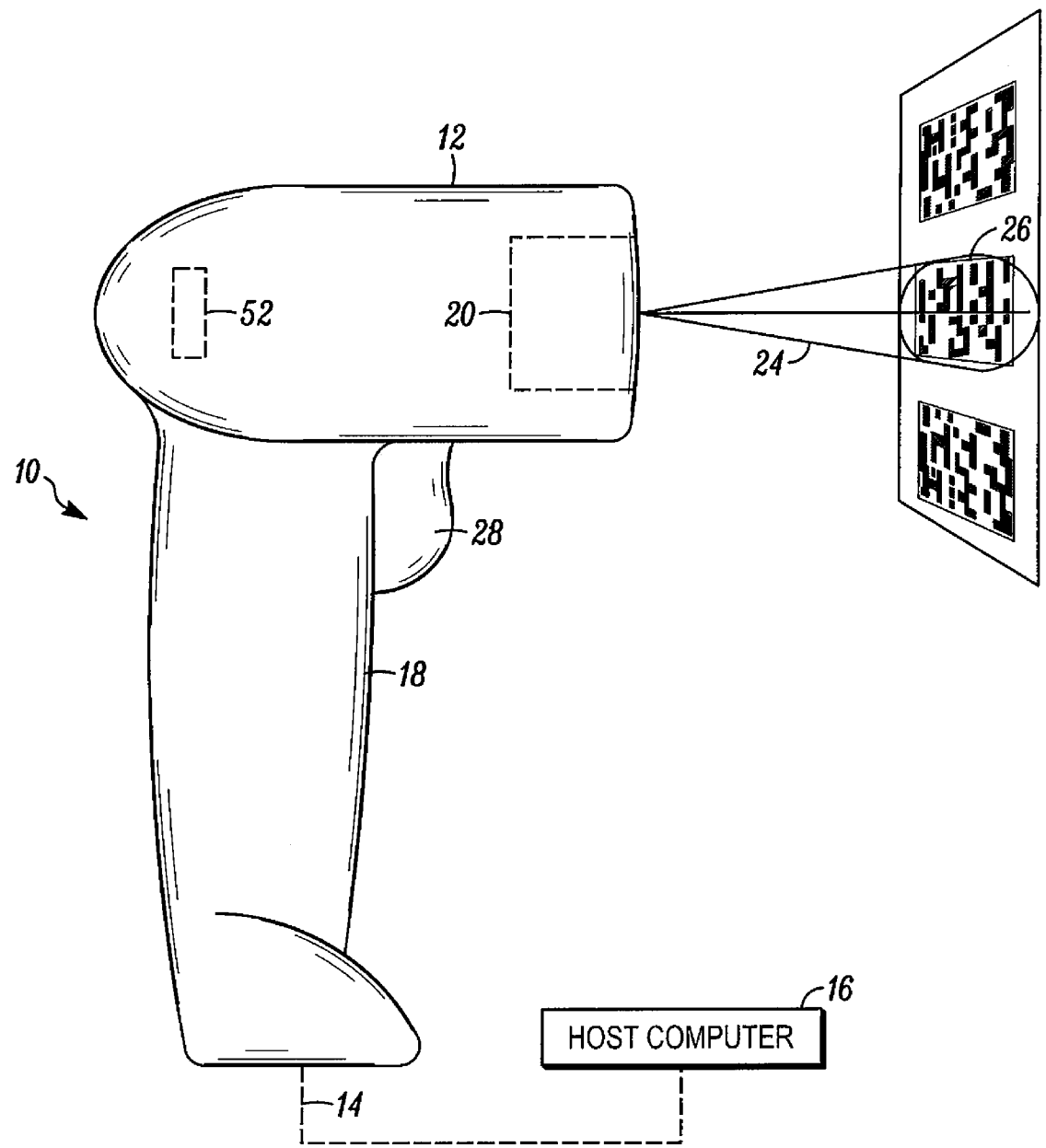
FIG. 1 is a side elevation view of an imaging scanner constructed in accordance with one example embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An imaging system 10 includes an imaging scanner 12 in communication 14 either through hard-wire or over-the-air (remote communication) to a host computer 16 as shown schematically in FIG. 1. The imaging scanner 12, in addition to imaging both 1D and 2D bar codes and postal codes, is also capable of capturing images and signatures. In one exemplary embodiment of the present invention, the imaging scanner 12 is a hand held portable imager supported in a housing 18 that can be carried and used by a user walking or riding through a store, warehouse, or plant for imaging bar codes for stocking and inventory control purposes.

However, it should be recognized that the imaging system 10 of the present invention, to be explained below, may be advantageously used in connection with any type of scanner or imaging device, be it portable or stationary. It is the intent of the present invention to encompass all such scanners and imagers.

Internal to the imaging scanner 12 is a scan engine 20. The scan engine 20 includes an illumination source 22 such as a light emitting diode (LED) or bank of LEDs for projecting light 24 at a target object 26 such as a bar code. The imaging scanner 12 can be automatically enabled, continuously enabled, or enabled by engaging a trigger 28, which initiates the projection of the light 24 in the hand-held system 10 as it is directed by a user toward the target object 26.

Figure 2:
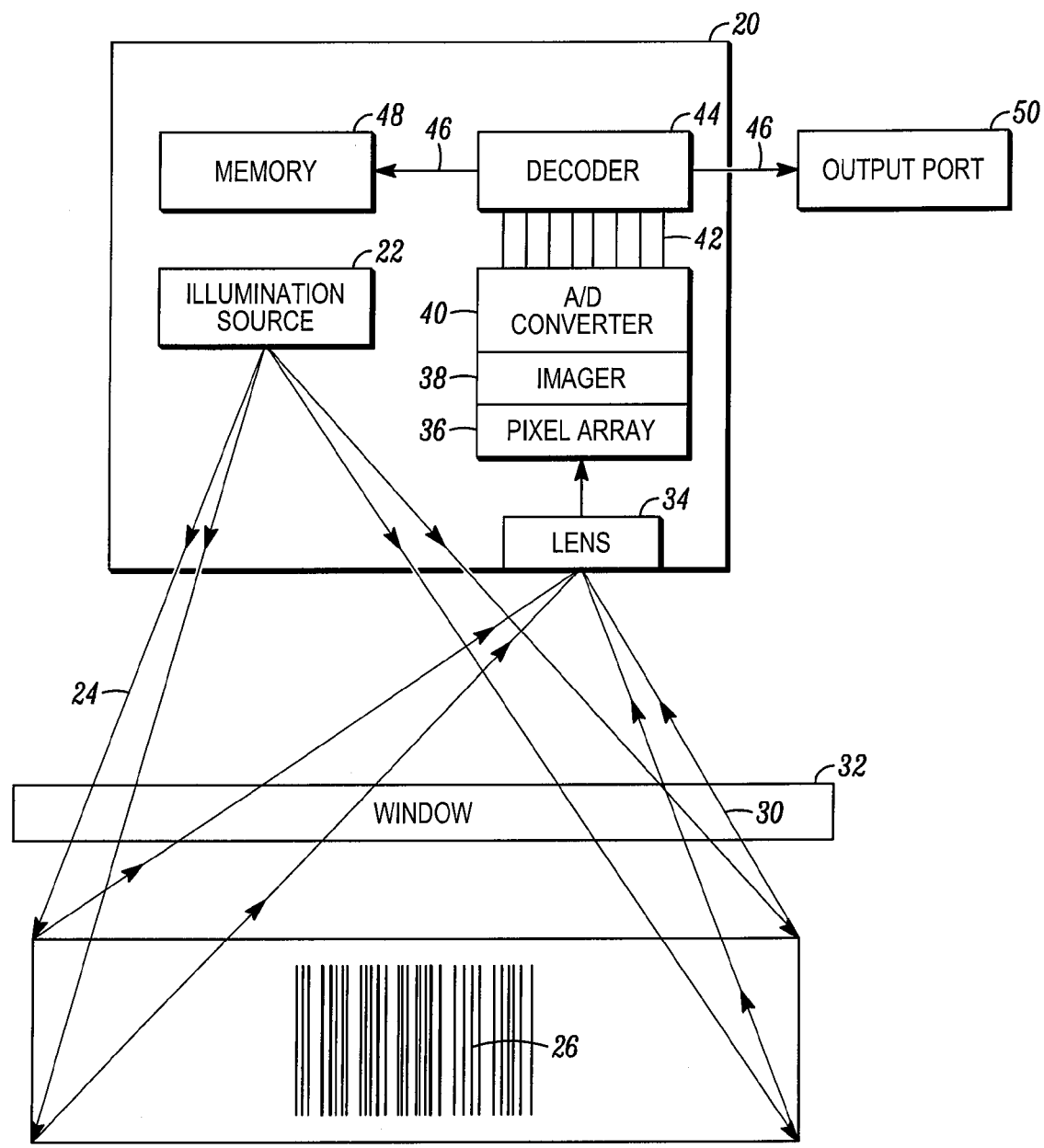
FIG. 2 is a schematic diagram illustrating a scan engine located within the imaging scanner of FIG. 1.

FIG. 2 is a schematic illustration of the scan engine 20 associated with the imaging scanner 12. Reflected light 30 from the target object 26 passes through a window 32 located in the housing 18 of the imaging scanner 12 onto a focusing lens 34 internal to the scan engine 20. The lens 34 focuses the reflected light onto a pixel array 36 of an imager element 38. The imager element 38 includes photosensitive elements such as the imaging pixel array 36 that could be for example, a charged coupled device (CCD) array or complementary metal oxide semiconductor (CMOS) array. The imager element 38 also includes an analog-to-digital (A/D) converter 40 for converting an analog signal produced by the imager element 38 over to the digital domain.

A bus connection 42 provides a communication link between the imager element 38 and a decoder 44. The bus connection 42 is a high-speed (8) bit parallel interface for providing a digital signal to the decoder 44 representative of the captured image frame. The decoder 44 processes the digitized signals and attempts to decode the target object 26 into decoded information 46. The decoded information 46 can be stored locally by the scan engine 20 in memory 48 and/or communicated to a peripheral device (not shown) such as a monitor or remote computer through an output port 50.

The illumination source 22 can include multiple LEDs. In some modes of operation, these LEDs are driven somewhat simultaneously with a current pulse in order to provide a pulsed illumination directed toward a target object. In the presence of relative motion between the imager and the target object, especially at high swipe speeds of 50 inches per second or greater, the time period of the pulsed illumination can be 500 microseconds or less. High intensity of pulsed illumination can be used to minimize the image blur due to the rapid motion of the target object. In order to generate such high intensity of pulsed illumination, the imaging scanner can include large number of LEDs for the illumination source 22, and each of these LED may even be overdriven with a current pulse which has a peak current that is much higher than its rated DC operating current.

In one implementation of the imaging scanner, twelve LEDs are used for the illumination source 22, and the peak current of the current pulse applied to each of these LEDs is about 150 mA. With such implementation, the total peak current required to drive all these LEDs is about 150 mA×12=1800 mA. This total peak current may exceed the maximum current that can be supplied by a power source. For example, if the imaging scanner (or the scan engine) draws its power from a USB 2.0 port, the maximum current that can be provided by this USB port is limited to 500 mA. In order to provide a total peak current for the illumination source 22 that exceeds the maximum current of a power source, one or more storage capacitors can be used to store the electric energy between the current pulses and to release the stored electric energy at the instant that a current pulse is to be generated.

Figure 3:
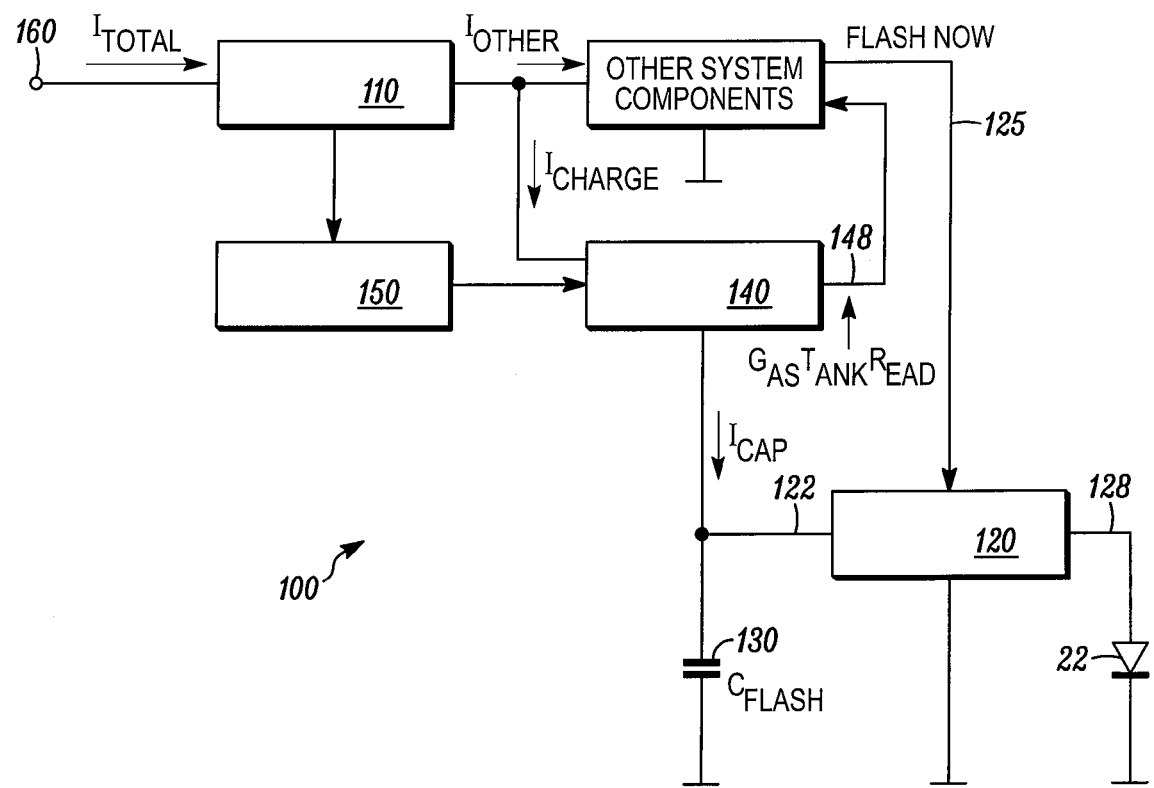
FIG. 3 is a block diagram of an apparatus for providing current pulses to the illumination source in an imaging scanner in accordance with some embodiments.

FIG. 3 is a block diagram of an apparatus 100 for providing current pulses to the illumination source in an imaging scanner in accordance with some embodiments. The apparatus 100 includes a current sensing circuit 110, an illumination driver circuit 120, a storage capacitor 130, and a charger circuit 140. The current sensing circuit 110 is operative to provide a current-monitoring signal related a current $I_{TOTAL}$ supplied from a current port 160. The illumination driver circuit 120 is operative to provide a driving current for the illumination source 22. The illumination source 22 can include one or more LEDs. The storage capacitor 130 is operative to supply a current to the illumination driver circuit 120. The charger circuit 140 is operative to provide to the storage capacitor 130 a charge current $I_{CAP}$ that depends upon the current-monitoring signal provided by the current sensing circuit 110. In one embodiment, the apparatus 100 includes a charge-rate controller 150 that is operatively couple to the charger circuit 140 for adjusting the charge current $I_{CAP}$ provided to the storage capacitor 130 based on the current-monitoring signal received from the current sensing circuit 110.

In operation, part of the current $I_{TOTAL}$ supplied from a current port 160 can be used to charge the storage capacitor 130, and part of the current $I_{TOTAL}$ can be used to supply the current for other components in the system. In FIG. 3, the current $I_{TOTAL}$ is divided into two parts: the current $I_{CHARGE}$ provided to the charger circuit 140, and the current $I_{OTHER}$ provided to other system components. The current $I_{CHARGE}$ provided to the charger circuit 140 can be substantially equal to the charge current $I_{CAP}$ provided to the storage capacitor 130 if the charger circuit 140 itself uses only very small amount of current for powering itself. In general, an increase in the charge current $I_{CAP}$ provided to the storage capacitor 130 results an increase in the current $I_{CHARGE}$ provided to the charger circuit 140, and vice versa; that is, an increase in the current $I_{CHARGE}$ available to the charger circuit 140 results an increase in the charge current $I_{CAP}$ available to the storage capacitor 130.

In operation, the current $I_{TOTAL}$ supplied from the current port 160 is monitored with the current sensing circuit 110. A current-monitoring signal from the current sensing circuit 110 is coupled to the charge-rate controller 150. The current-monitoring signal is generally related to the current $I_{TOTAL}$ supplied from the current port 160. For example, the current-monitoring signal can be directly proportional to the current $I_{TOTAL}$. The charge-rate controller 150 is couple to the charger circuit 140 for adjusting the charge current $I_{CAP}$ provided to the storage capacitor 130 based on the current-monitoring signal received from the current sensing circuit 110. The charge-rate controller 150 can control the charger circuit 140 to adjust the charge current $I_{CAP}$ in such away to maintain the current $I_{TOTAL}$ substantially close to a predetermined value. This predetermined value generally is not more than the maximum current that can be provided by the current port 160. For example, for a USB 2.0 port, the current $I_{TOTAL}$ can be kept substantially close to but not more than 500 mA.

In FIG. 3, the current $I_{OTHER}$ provided to other system components may change with time. During the time period that the current $I_{OTHER}$ required by other system components is decreased, more current from the current port 160 is available for charging the storage capacitor 130. In cases where other system components are using less power, such as when the laser is off, the system 100 will adapt to this change by sending more power to the illumination system to recharge the flash system more quickly or to drive the LEDs harder in torch mode. The examples of when additional power can be supplied to the illumination system include: (1) the microcontroller is sleeping or running at lower speeds; (2) ambient temperature is not at worst-case; and (3) silicon in the system is not at worst-case process corners.

In FIG. 3, the charger circuit 140 can also include an output 148 for generating a gas tank reading signal, which generally is a parameter related to a voltage across the storage capacitor 130. A microcontroller in the system 100 can use this gas tank reading signal to determine when, and how long to flash. In one implementation, the microcontroller can compare the gas tank reading signal with a threshold value. If the gas tank reading signal is larger than a predetermined threshold value, the microcontroller can send a Flash Now signal to illumination driver circuit 120. The Flash Now signal can serve as a trigger signal for the illumination driver circuit 120 to generate a current pulse for the illumination source 22. The length of the current pulse can be determined by amount of charge stored in the storage capacitor 130. Alternatively, the length of the current pulse can be determined by the length of the Flash Now signal.

The Flash Now signal generally is sent to the illumination driver circuit 120 after a comparison condition is met indicating that the gas tank reading signal is larger than the predetermined threshold value. In one implementation, after the comparison condition is met, the Flash Now signal is sent to the illumination driver circuit 120 immediately. In one implementation, after the comparison condition is met, the Flash Now signal is sent to the illumination driver circuit 120 only after receiving further instructions from the microcontroller.

In FIG. 3, the current-monitoring signal from the current sensing circuit 110 can also be sent to the microcontroller. In one implementation, the information in the current-monitoring signal can be used by the microcontroller to set exposure settings in Torch mode of an imaging scanner. The current sensing circuit 110 can also include an input for receiving a maximum-current setting signal from the microcontroller. This signal can be sued to set the maximum current that should be drawn from the current port 160. In some other implementations, the current sensing circuit 110 can also include an inrush current limiter.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An imager for imaging target objects comprising:
   an illumination source for providing illumination directed towards a target object;
   photosensitive elements located within the imager for capturing an image from the target object while the imager is activated during an exposure period;
   a current sensing circuit operative to provide a current-monitoring signal related to a current supplied from a current port;
   an illumination driver circuit operative to provide a driving current for the illumination source;
   a storage capacitor operative to supply a current to the illumination driver circuit to provide the driving current for the illumination source, wherein a total peak driving current for the illumination source exceeds a maximum current supplied from the current port; and
   a charger circuit operative to provide to the storage capacitor a charge current that depends upon the current-monitoring signal provided by the current sensing circuit.

2. The imager of claim 1, wherein:
   the current port is a USB port.

3. The imager of claim 1, wherein:
   the charger circuit is operative to output a storage-monitoring signal related to a voltage across the storage capacitor.

4. The imager of claim 1, wherein:
   the charger circuit is operative to output a storage-monitoring signal proportional to a voltage across the storage capacitor.

5. The imager of claim 1, further comprising:
   a charge-rate controller operatively coupled to the charger circuit for adjusting the charge current provided to the storage capacitor based on the current-monitoring signal received from the current sensing circuit for maintaining the current supplied from the current port substantially close to a predetermined value.

6. An imager for imaging target objects comprising:
   an illumination source for providing illumination directed towards a target object;
   photosensitive elements located within said imager for capturing an image from the target object while the imager is activated during an exposure period;
   an illumination driver circuit operative to provide a driving current for the illumination source;
   a storage capacitor operative to supply a current to the illumination driver circuit to provide the driving current for the illumination source, wherein a total peak driving current for the illumination source exceeds a maximum current supplied from a current port; and
   a charger circuit operative to adjust a charge current provided to the storage capacitor for maintaining the current supplied from the current port substantially close to a predetermined value.

7. The imager of claim 6, wherein:
   the current port is a USB port.

8. The imager of claim 6, wherein:
   the charger circuit is operative to output a storage-monitoring signal related to a voltage across the storage capacitor.

9. The imager of claim 6, wherein:
   the charger circuit is operative to output a storage-monitoring signal proportional to a voltage across the storage capacitor.

10. The imager of claim 6, further comprising:
    a current sensing circuit operative to provide a current-monitoring signal related to the current supplied from the current port;
    a charge-rate controller receiving the current-monitoring signal from the current sensing circuit and operatively coupled to the charger circuit for adjusting the charge current provided to the storage capacitor based on the current-monitoring signal.

11. A method comprising:
    sensing a current supplied from a current port to obtain a current-monitoring signal;
    controlling a charge current provided to a storage capacitor based on the current-monitoring signal;
    measuring a parameter related to a voltage across the storage capacitor; and
    generating a driving current for the illumination source by the illumination driver circuit, if the parameter is above a predetermined threshold value, to provide a driving current for a illumination source in an imaging scanner having photosensitive elements located therein, wherein the illumination driver circuit is operatively coupled to the storage capacitor to receive a current therefrom, wherein a total peak driving current for the illumination source exceeds a maximum current supplied from the current port.

12. The method of claim 11, wherein the controlling a charge current for a storage capacitor comprises:
    adjusting the charge current provided to the storage capacitor for maintaining the current supplied from the current port substantially close to a predetermined value.

13. The method of claim 11, wherein the generating a driving current for the illumination source comprises:
    generating a driving current for the illumination source with the illumination driver circuit automatically, if the parameter is above a threshold value.

14. The method of claim 11, wherein the generating a driving current for the illumination source comprises:
    generating a driving current for the illumination source with the illumination driver circuit upon receiving a trigger signal by the illumination driver circuit.

15. The method of claim 11, wherein the measuring a parameter comprises:
    measuring the voltage across the storage capacitor.

* * * * *